United States Patent [19]
Nishida

[11] Patent Number: 5,815,985
[45] Date of Patent: Oct. 6, 1998

[54] STABILIZER FOR AUTOMOBILE DOOR GLASS

[75] Inventor: Ryuhei Nishida, Yokohama, Japan

[73] Assignee: Illinois Tool Works Inc., Glenview, Ill.

[21] Appl. No.: 677,216

[22] Filed: Jul. 9, 1996

[51] Int. Cl.$^6$ .................................................. E06B 7/16
[52] U.S. Cl. ............................................ 49/377; 49/490.1
[58] Field of Search .......................... 49/374, 377, 475.1, 49/490.1

[56] References Cited

U.S. PATENT DOCUMENTS

| | | | |
|---|---|---|---|
| 3,763,596 | 10/1973 | Anderson | 49/496 |
| 4,442,634 | 4/1984 | Kimura | 49/377 X |
| 4,571,888 | 2/1986 | Jensen | 49/374 X |
| 4,799,334 | 1/1989 | Sato | 49/377 X |
| 4,860,494 | 8/1989 | Fujii et al. | 49/377 X |

FOREIGN PATENT DOCUMENTS

| | | |
|---|---|---|
| 56-131419 | 10/1981 | Japan . |
| 4-4890 | 2/1987 | Japan . |

*Primary Examiner*—Peter R. Brown
*Attorney, Agent, or Firm*—Schwartz & Weinrieb

[57] ABSTRACT

A stabilizer system for an automobile door glass or window component comprises a support platform and a slide mechanism slidable thereon. The slide mechanism has a contact member mounted thereon which is adapted to engage the door glass or window component and exert a predetermined amount of pressure thereon so as to render the same stable during operation of the motor vehicle. Detent latching members are provided upon the support platform and slide mechanism so as to permit predetermined adjustment of the slide mechanism with respect to the support platform, and the support platform and slide mechanism have guide rails, frames, and grooves which permit the slide mechanism to be adjustably moved only in the horizontal direction with respect to the support platform. In this manner, since vertical movement of the slide mechanism is effectively precluded, the slide mechanism, and the contact member carried thereby for engaging the door glass or window component, cannot be carried or dragged along with the door glass or window component as the latter undergoes its upward and downward movements, and consequently, positional adjustment of the slide mechanism with respect to the support platform and the door glass or window component cannot be undesirably or inadvertently altered despite repeated movements of the door glass or window component in the upward and downward directions.

20 Claims, 6 Drawing Sheets

STABILIZER FOR AUTOMOBILE DOOR GLASS

FIELD OF THE INVENTION

The present invention relates generally to automotive door glass or window stabilizers, and more particularly to an automotive door glass or window stabilizer which is capable of suppressing vibrations of the door glass or window component within the door unit of the automobile by means of a member which is disposed in contact with a surface of the door glass or window component such that vibrations of the door glass or window component are suppressed and yet movement of the door glass or window component in its upward and downward modes is not unduly restricted or restrained.

BACKGROUND OF THE INVENTION

In an automobile, especially those in which sashless door glass or window components are mounted within the door assemblies, stabilizers are traditionally provided with members or bodies which are pressed into contact with a surface of the door glass or window component within the door assembly in order to prevent the door glass or window component from undergoing, experiencing, or exhibiting vibrations or rattling noises while the automobile is moving or while the automobile door is being opened or closed.

An example of such a conventional door glass or window component stabilizer is disclosed within Japanese Patent Publication SHO 56-131419. However, in accordance with such invention, the disclosed stabilizer comprises a contact body or member which is anchored or mounted directly upon the interior door panel at a position disposed opposite the door glass or window component whereby adjustment of the contact body or member with respect to the door glass or window component is rendered quite difficult. Consequently, the contact pressure defined between the contact body or member and the door glass or window component may be too low or insufficient whereby the door glass or window component will experience vibration and generate noise, or alternatively, the contact pressure defined between the contact body or member and the door glass or window component may be too high whereby an inordinate amount of force may be required to raise or lower the door glass or window component.

Accordingly, in order to overcome the aforenoted disadvantages of such conventional stabilizer systems, the applicant of the present invention has previously proposed the invention disclosed within Japanese Utility Model HEI 4-4890 which is disclosed within FIG. 10 of the drawings of the present patent application. More particularly, as disclosed within FIG. 10 of the drawings, a frame member 3 is fixedly mounted upon an interior automobile door panel 2 which is laterally spaced from the automobile door glass or window component 1, and a contact body or member 5, having hair or bristle members 4 fixed thereon and adapted to engage or contact a surface of the door glass or window component 1, is mounted upon frame 3 so as to be disposed within the space defined between the door glass or window component 1 and the interior door panel 2. A wedge-shaped member 6, wherein the lateral thickness of the same progressively increases in the vertically upward direction, is inserted in the downward direction between the contact body or member 5 and the interior door panel 2. The wedge-shaped member 6 comprises a plurality of vertically spaced ratchet grooves 6a, and the contact body or member 5 is provided with a latching claw member 5a for engaging one of the ratchet grooves 6a of the wedge-shaped member 6 whereby the relative disposition of the contact body or member 5 with respect to wedge-shaped member 6, and accordingly with respect to the door glass or window component 1, may be adjusted as desired. More specifically, it may be readily appreciated that as the wedge-shaped member 6 is pushed or moved downwardly between the contact body or member 5 and the interior door panel 2, the latching claw member 5a of the contact body or member 5 is engaged with a progressively higher one of the ratchet grooves 6a of the wedge-shaped member 6. The wedge-shaped configuration of the member 6, and the disposition of the grooves 6a upon the inclined surface of the member 6, thus causes the contact body or member 5 to be progressively moved closer toward the door glass or window 1 as the wedge-shaped member 6 is moved progressively downwardly.

While the aforenoted system of Japanese Utility Model HEI 4-4890 thus readily permits easy adjustment of the relative disposition of the contact body or member 5 with respect to the door glass or window 1 by means of the manipulation of the wedge-shaped member 6, and is therefore a substantial improvement with respect to the previously employed prior art systems, a problem arises in connection with the system of Japanese Utility Model HEI 4-4890 in that as the door glass or window 1 is repeatedly raised and lowered, and due to the pressured contact defined between contact body or member 5, through means of its hairs or bristles 4, and the door glass or window 1, contact body or member 5 tends to be carried or dragged along with the door glass or window 1 in the upward direction as the door glass or window 1 repeatedly undergoes its raised movements. Accordingly, the latching claw member 5a of the contact body or member 5 becomes latched within a higher one of the latching or ratchet grooves 6a of the wedge member 6, and consequently, over a period of time, contact body or member 5 will be moved progressively closer to the door glass or window 1 whereby the contact pressure defined between the contact body or member 5 and the door glass or window 1 will be progressively increased still further. As a result of such increased contact pressure defined between contact body or member 5 and the door glass or window 1, contact body or member 5 will be moved progressively higher along wedge-shaped member 6 and progressively closer to door glass or window 1 whereby ultimately it will be very difficult to raise or lower the door glass or window 1.

OBJECTS OF THE INVENTION

Accordingly, it is an object of the present invention to provide a new and improved stabilizer system for automobile door glass or window components.

Another object of the present invention is to provide a new and improved stabilizer system for automobile door glass or window components which overcomes the various disadvantages and operational drawbacks characteristic of the prior art stabilizer systems as noted hereinbefore.

A further object of the present invention is to provide a new and improved stabilizer system for automobile door glass or window components wherein the contact pressure defined between the stabilizer and the door glass or window is able to be easily and readily adjusted, and wherein further, such adjustment, once made or established, will be retained or fixed and will not be inadvertently or unintentionally adjusted further as a result of the repetitive or cyclical raising and lowering operations of the door glass or window.

SUMMARY OF THE INVENTION

The foregoing and other objectives are achieved in accordance with the present invention through the provision of a stabilizer system for automobile door glass or window components which comprises a wedge-shaped member or support platform which is fixed to the interior door panel of the automobile and wherein the same has an inclined surface which extends in the horizontal direction as opposed to extending in the vertical direction as was the case of the prior art system. The contact body or member, which is in the form of a slide mechanism, is adapted to be moved in the horizontal direction and in a progressively latched mode upon such horizontally disposed wedge-shaped member, the support platform being provided with a plurality of latching detents while the slide mechanism is provided with a plurality of latching grooves. In this manner, adjustment of the contact body or member relative to the interior door panel, the wedge-shaped member or support platform, and the door glass or window occurs in a direction which is perpendicular to the upward and downward movement of the door glass or window. Accordingly, the contact body or member is not carried or pulled along with the door glass or window as the latter is repeatedly raised and lowered, and concomitantly, and most importantly, the relative disposition of the contact body or member with respect to the door glass or window, and the pressured contact defined therebetween, is not altered even when the door glass or window is repeatedly moved upwardly and downwardly. Means are also provided for enabling release of the latching detents of the support platform from the latching grooves of the slide mechanism so as to permit the latter to be adjusted in a reverse mode or to be removed from the support platform.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
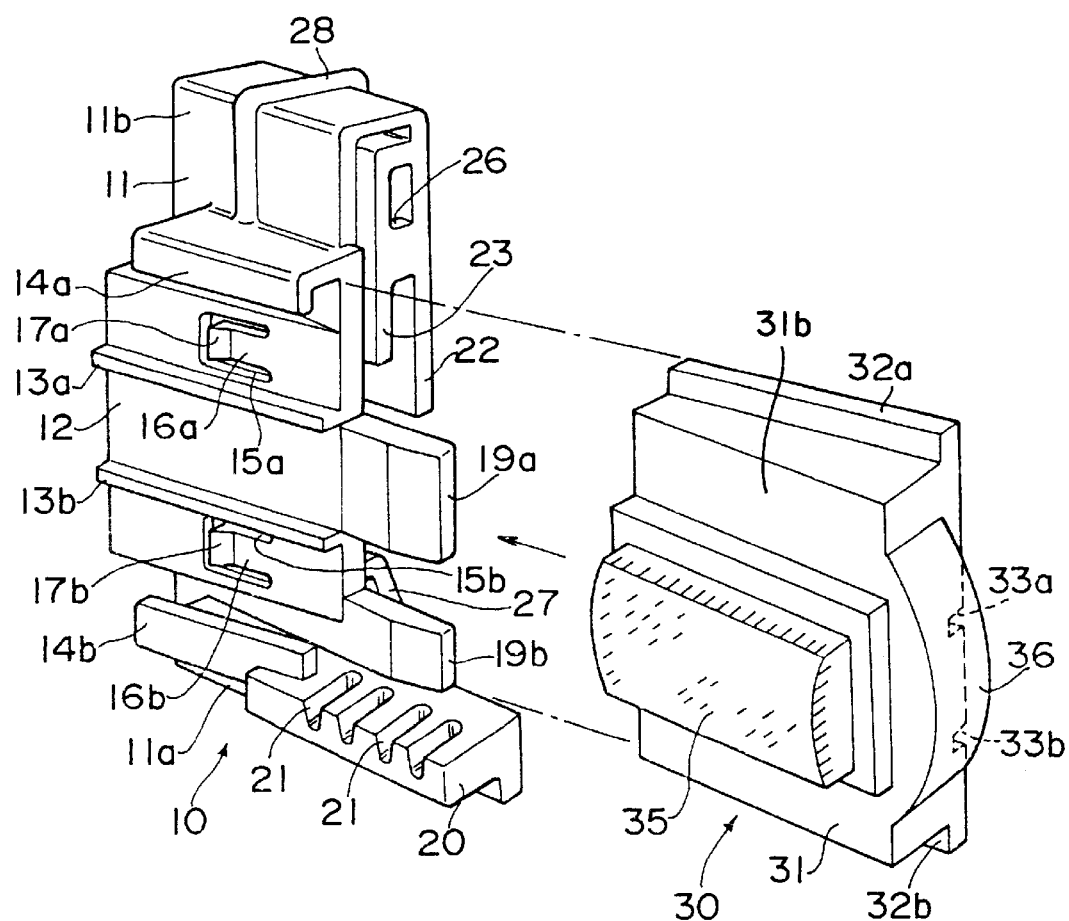
FIG. 1 is an exploded perspective view of a new and improved stabilizer system for automobile door glass or window components constructed in accordance with the principles of the present invention and showing the cooperative parts thereof.
Figure 2:
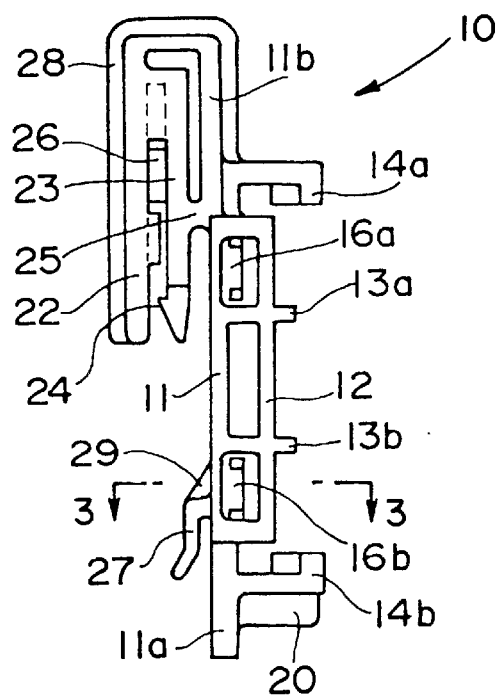
FIG. 2 is a side elevational view of the support platform of the stabilizer system of FIG. 1.
Figure 3:
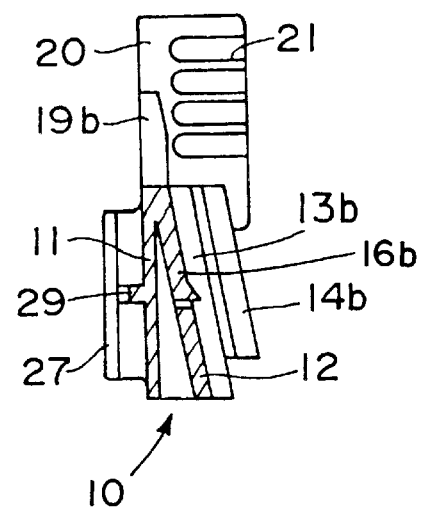
FIG. 3 is a cross-sectional view of the support platform as shown in FIG. 2 as taken along the line 3—3 in FIG. 2.

Referring now to the drawings and more particularly to FIGS. 1–7 thereof, the stabilizer system constructed in accordance with the teachings of the present invention is seen to comprise a support platform generally indicated by the reference character 10 and a slide mechanism generally indicated by the reference character 30. More particularly, the support platform 10 comprises a base plate 11 upon which is disposed or from which projects at an angle with respect thereto an inclined wall 12 such that the cross-sectional configuration of the support platform 10 as defined by base plate 11 and inclined wall 12 is substantially that of a V as seen in FIG. 3. The outer surface of inclined wall 12 is provided with a pair of vertically spaced, horizontally extending guide rails 13a, 13b which, as will be more fully appreciated hereinafter, are accommodated within a pair of vertically spaced, horizontally extending grooves 33a,33b provided upon an interior surface of slide mechanism 30. In a similar manner, base plate 11 is further provided with vertically spaced, horizontally extending guide frames 14a, 14b which have substantially L-shaped cross-sectional configurations for likewise accommodating vertically spaced, horizontally extending edge rails 32a,32b provided upon the slide mechanism 30. In this manner, the slide mechanism 30 is restrained vertically and is guided in its horizontal movements with respect to support platform 10.

Figure 4:
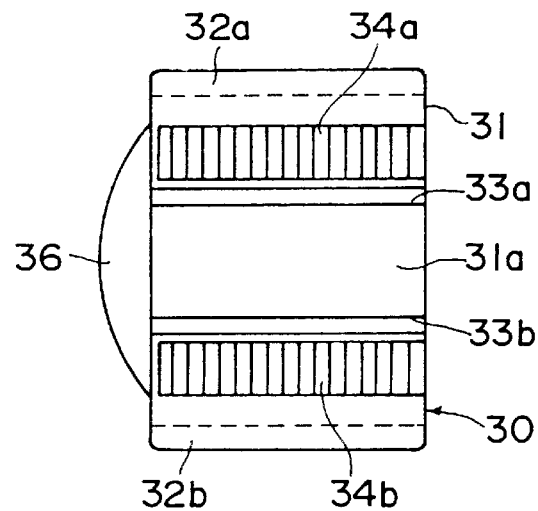
FIG. 4 is a rear elevational view of the slide mechanism of the stabilizer system of FIG. 1.
Figure 8:
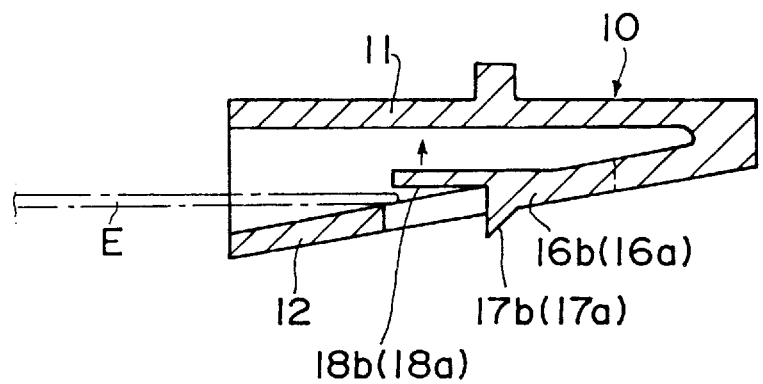
FIG. 8 is a cross-sectional view of the support platform of the stabilizer system of the present invention illustrating how the latching detents thereof may be released, with respect to the latching grooves of the slide mechanism, by a manipulating tool.
Figure 9:
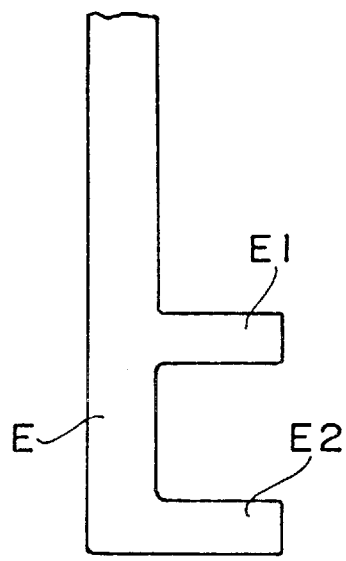
FIG. 9 is a front elevational view of a manipulating tool which may be used to release the latching detents of the support platform as shown in FIG. 8.

The inclined wall 12 is further provided with flexible, elastic members 16a,16b respectively located above and below guide rails 13a,13b and which are defined upon inclined wall 12 by means of substantially C-shaped slits 15a,15b. At the tips of the elastic members 16a,16b there is respectively provided a latch claw 17a,17b which are adapted to latchingly mate with sets of vertically spaced, horizontally extending latch grooves 34a,34b which are provided upon the inner surface of the slide mechanism 30 at corresponding positions above and below grooves 33a, 33b as best seen in FIG. 4. Preferably, as shown more particularly in FIG. 8, each elastic member 16a,16b is also provided with an extension portion 18a,18b which is integral with a respective one of the latch claws 17a,17b and is disposed within the space defined between the base plate 11 and the inclined wall 12. In this manner, when the latch claws 17a,17b are to be released from their engagement with the latch grooves 34a,34b, a suitable manipulating tool E may be inserted into the space defined between the base plate 11 and the inclined wall 12 so as to move the extension portions 18a,18b inwardly into the space defined between the base plate 11 and the inclined wall 12 so that the latch claws 17a,17b are likewise moved inwardly into the space defined between the base plate 11 and the inclined wall 12 as permitted by the elastic deformation of the elastic members 16a,16b. An exemplary tool E is more particularly disclosed in FIG. 9 and is seen to include two tines or the like such that both extension portions 18a,18b may be manipulated simultaneously.

Figure 5:
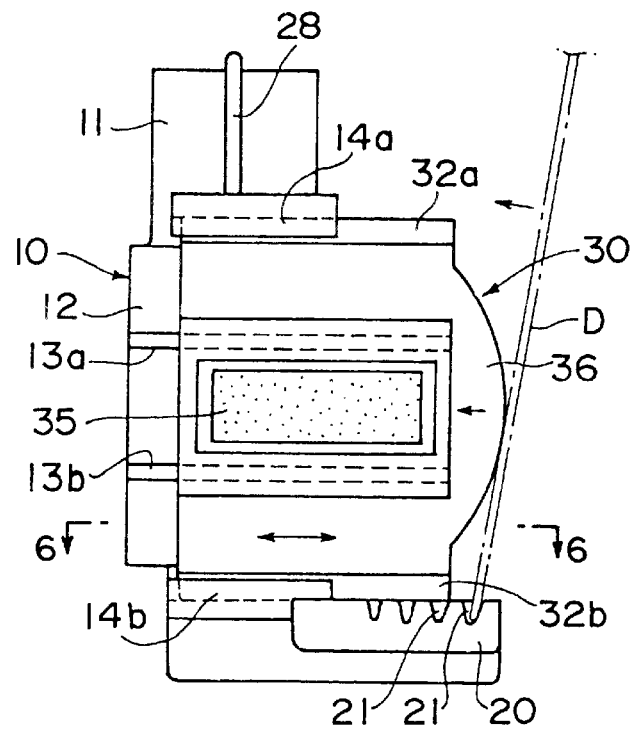
FIG. 5 is a front elevational view of the support platform and slide mechanism components of the stabilizer system of FIG. 1 when the support platform and slide mechanism components are assembled together.
Figure 6:
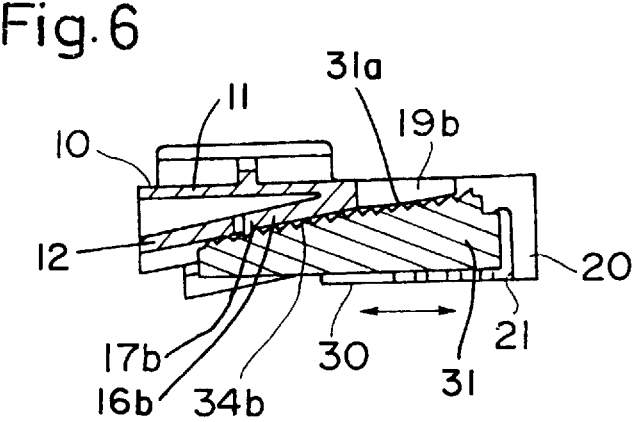
FIG. 6 is a cross-sectional view of the assembled stabilizer system of FIG. 5 as taken along the line 6—6 of FIG. 5.

With continued reference being made to FIG. 1, one side of base plate 11 is further provided with a pair of vertically spaced, horizontally extending extension members 19a,19b in order to increase or enlarge the sliding range of the slide mechanism 30 upon the support platform 10, and a horizontally extending support arm 20 is integrally formed with the lower end 11a of the base plate 11 as well as the lower side of extension member 19b. A plurality of horizontally spaced grooves 21 are formed within upper and front surface portions of the support arm 20, and as best seen in FIG. 5, one end of a suitable manipulating tool D may be inserted within a particular one of the grooves 21 such that the body portion of the tool D can engage a protrusion portion 36 of the slide mechanism 30 and, acting as a fulcrum, thereby bias the slide mechanism 30 in the leftward direction as seen in FIG. 5 such that an adjusted disposition of the slide mechanism 30 with respect to the support platform 10, as determined by the interengaging latch claws 17a,17b of support platform 10 and latch grooves 34a,34b of the slide mechanism 30, can be readily and easily achieved. As can best be appreciated from FIGS. 1 and 6, the slide mechanism 30 comprises a main body 31 which has a substantially wedge-shaped configuration such that a rear surface 31a thereof, upon which the ratchet-type latch grooves 34a,34b are disposed, is inclined with respect to a front surface 31b thereof, upon which is provided a window or glass-engaging contact member 35 which comprises a plurality of hairs or bristles. As best seen from FIG. 6, the inclinations of the inclined wall 12 of the support platform 10 and the rear surface 31a of the slide mechanism 30, or alternatively the wedge-shaped configurations of such components of the platform 10 and mechanism 30, are reversibly complementary with their thicker and thinner ends disposed opposite to each other such that as the slide mechanism 30 is moved leftwardly in either one of FIG. 1 or 6, the contact member 35 will move closer to, or exert greater pressure upon, the automobile door glass or window component 1 as shown in FIG. 7.

Figure 7:
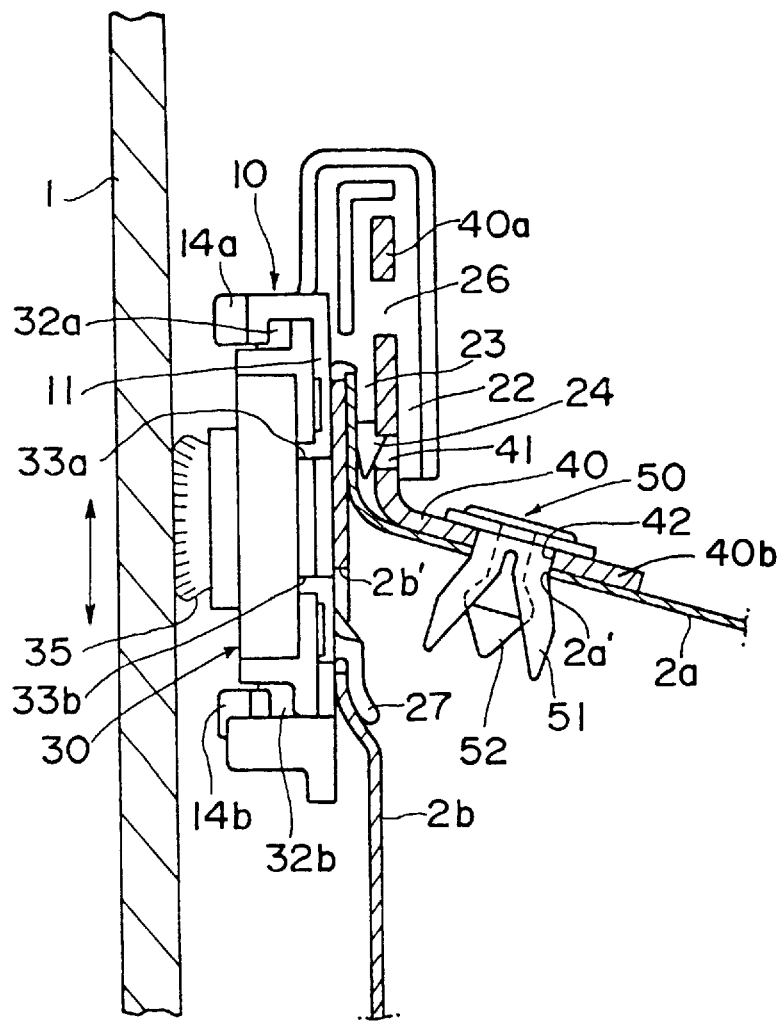
FIG. 7 is a cross-sectional view of the stabilizer system of the present invention when mounted upon the interior door panel of an automobile and being used in conjunction with an automobile door glass or window for stabilizing the same.

In order to facilitate the mounting of the stabilizer upon the automobile door unit, the support platform 10 further comprises, as best seen in FIGS. 1, 2, and 7, a first frame member 22 which depends downwardly from the upper end 11b of the base plate 11, and a second frame member 23 which is integrally fixed to and laterally spaced from the first frame member 22 such that the second frame member 23 is interposed between the first frame member 22 and the base plate 11. The lower end portion of the second frame member 23 is provided with a latch claw 24 which is disposed toward the first frame member 22, and a first connection portion 25 integrally connects the second frame member 23 to the base plate 11 while second connection portions 26 integrally connect opposite side or end portions of the second frame member 23 to opposite side or end portions of the first frame member 22. The rear surface of base plate 11 is also provided with a hanging latch member 27, and reinforcing ribs 28 and 29 are respectively provided upon the upper end portion 11b of the base plate 11, as well as between the latch member 27 and the rear surface of base plate 11.

In use, the support platform 10 and the slide mechanism 30 are initially assembled together by inserting the rail members 32a, 32b of the slide mechanism 30 within the guide frames 14a,14b of the support platform 10, and similarly, the guide rails 13a,13b of the support platform 10 are inserted within the guide grooves 33a,33b of the slide mechanism 30, to such an extent that the latch claws 17a,17b of the elastic members 16a,16b of the support platform 10 engage the latch grooves 34a,34b of the slide mechanism 30.

Subsequently, as shown in FIG. 7, one leg 40a of a substantially V-shaped attachment fixture 40 is inserted within the framework of the support platform 10 such that the leg 40a of the fixture 40 is interposed between the first and second frame members 22 and 23, and in addition, the latch claw 24 will be snap-fittingly engaged within an aperture 41 of the leg portion 40a of the fixture 40. An interior panel of an automobile door unit comprises an inner panel 2a and a reinforcement panel 2b which are joined to each other at one end thereof, and this joined end portion of the interior panel is inserted within the space defined between the rear or inner surface of the base plate 11 and the second frame member 23 such that the hanging or dependent latch member 27 is disposed within an aperture 2b' defined within reinforcement panel whereby the stabilizer system of the present invention is supported upon the reinforcement panel 2b of the automobile door unit interior panel. As a result of such mounting of the stabilizer system, the base plate 11, having the slide mechanism 30 assembled or mounted thereon, is interposed between the reinforcement panel 2b and the door glass or window component 1. To complete the mounting of the stabilizer system upon the automobile door unit interior panel, an attachment aperture 42 defined within the other leg 40b of the attachment fixture 40 is aligned with an attachment aperture 2a' defined within the inner panel 2a and a suitable fastener 50 is inserted through such attachment apertures 42,2a'. While the fastener 50 may be of any suitable type, the illustrated fastener 50 comprises an expandable cylindrical body 51 and an insertion member 52 whereupon insertion of the member 52 into the body 51, the latter is expanded radially outwardly.

Once the entire stabilizer system is assembled and mounted as illustrated in FIG. 7, adjustment of the slide mechanism 30 with respect to the support platform 10 is accomplished either by simply pushing the slide mechanism 30 to the left as viewed in either FIG. 1 or FIG. 5, or alternatively, by using the manipulating tool D to bias the slide mechanism 30 in the leftward direction with respect to the support platform 10. Accordingly, slide mechanism 30, guided in its slidable movement by means of the interaction of the edge guide rails 32a,32b within guide frames 14a,14b, as well as by means of the interaction of the guide rails 13a,13b within guide grooves 33a,33b, is moved in the leftward direction and is locked or latched at predetermined intervals of such travel by means of the interaction of the latch claws 17a,17b of the support platform 10 interacting with the latch grooves 34a,34b of the slide mechanism 30. It is of course additionally appreciated that while the slide mechanism 30 undergoes the aforenoted linear movement in the leftward direction, the interaction defined between the inclined wall portion 12 and the inclined surface 31a of the slide mechanism 30, as best appreciated from FIG. 6, serves to also force the slide mechanism 30 in the horizontal lateral or leftward direction, as viewed in FIG. 7, toward the automobile door glass or window component 1. In this manner, the slidable adjustment of the slide mechanism 30 with respect to the support platform 10 simultaneously causes lateral adjustment of the slide mechanism 30, and the contact member 35 carried thereby, with respect to the door glass or window component 1 and the degree of pressure exerted by the contact member 35 upon the door glass or window component 1. If the adjusted movement of the slide mechanism 30 with respect to the support platform 10 is such that the contact member 35 is disposed too close to the door glass or window component 1 whereby excessive pressure is exerted upon the door glass or window component 1 by means of the contact member 35, the slide mechanism 30 can of course be adjusted in the opposite direction by releasing the latch claws 17a,17b from the latch grooves 34a,34b by means of the manipulating tool E shown in FIGS. 8 and 9 and as discussed hereinbefore. In a similar manner, in order to prevent the disengagement of the slide mechanism 30 from the support platform 10 when these components are assembled together but before they are mounted upon the automobile door unit interior panel, means, not shown, may be provided within the guide frames 14a,14b and upon the edge guide rails 32a,32b which engage each other such that slidable movement of the slide mechanism 30 upon the support platform 10 in the leftward direction as seen in FIGS. 1 and 5 is limited and beyond which further relative movement is not possible.

Figure 10:
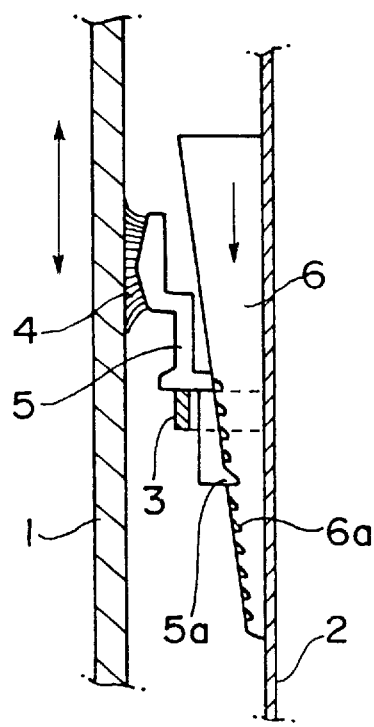
FIG. 10 is a cross-sectional view of a PRIOR ART stabilizer system in connection with which the present invention is an improvement thereover.

Thus, it may be seen that in accordance with the present invention, an improvement in the automobile door glass or window component stabilizing art has been provided in that the slide mechanism 30 can only be moved relative to the support platform 10 in the horizontal direction, any vertical movement of the slide mechanism 30 being entirely restrained or restricted by means of the interaction defined between the edge guide rails 32a,32b of the slide mechanism 30 and the guide frames 14a,14b of the support platform 10 as well as the guide rails 13a,13b of the support platform 10 and the guide grooves 33a,33b of the slide mechanism 30. As a result of such movement of the slide mechanism 30 only in the horizontal direction which is perpendicular to the vertical movement of the door glass or window component 1 when the latter undergoes such movement during its raised and lowered modes, and in view of the fact that the slide mechanism 30 cannot move in the vertical direction, the slide mechanism 30 cannot be carried or dragged along with the door glass or window component 1 when the same is repeatedly moved in its upward or downward modes. Consequently, the predetermined or adjusted disposition of the contact member 35 carried by the slide mechanism 30 and disposed in stabilizing contact with the door glass or window component 1 will not be undesirably or inadvertently altered despite the repetitive raising and lowering of the door glass or window component as was the case of the prior art system as illustrated in FIG. 10 of the drawings.

Obviously, many modifications and variations are possible in light of the above teachings. It is therefore to be understood that within the scope of the appended claims, the present invention may be practiced otherwise than as specifically described herein.

What is claimed as new and desired to be protected by Letters Patent of the United States of America is:

1. A stabilizer system for an automobile door glass window component which is adapted to be vertically raised and vertically lowered, comprising:

a support platform having a first predetermined dimensional extent oriented in a vertical direction and a second predetermined dimensional extent oriented in a horizontal direction, and means for fixedly attaching said support platform to an automobile door panel such that said support platform is fixedly immovable with respect to the automobile door panel when said support platform is mounted upon the automobile door panel;

a slide mechanism slidably mounted upon said support platform for movement between a plurality of adjustment positions with respect to said support platform;

a contact member mounted upon said slide mechanism for engaging a vertically movable automobile door glass window component and for exerting a predetermined amount of pressure upon the vertically movable automobile door glass window component, depending upon the adjustment position of said slide mechanism with respect to said support platform, so as to stabilize the vertically movable automobile door glass window component during operation of the automobile; and first and second means respectively defined upon said support platform and said slide mechanism for permitting positional adjustment of said slide mechanism, and said contact member mounted thereon, with respect to said support platform only in said horizontal direction, and for preventing movement of said slide mechanism, and said contact member mounted thereon, with respect to said support platform in said vertical direction such that said positional disposition of said slide mechanism, and said contact member mounted thereon, at a particular one of said adjustment positions is unaffected by repetitive vertically upward and vertically downward movements of the automobile door glass window component.

2. A stabilizer system as set forth in claim 1, wherein:

said means defined between said support platform and said slide mechanism comprises said support platform and said slide mechanism both having substantially wedge-shaped portions which comprise oppositely disposed inclined wall portions engaged with each other such that as said slide mechanism is positionally adjusted by movement in a first horizontal direction with respect to said support platform, said contact member mounted upon said slide mechanism is moved in a second horizontal direction toward said automobile door glass window component so as to exert a positionally adjusted predetermined amount of stabilizing pressure upon said automobile door glass window component.

3. A stabilizer system as set forth in claim 2, further comprising:

detent means defined between said slide mechanism and said support platform for latching said slide mechanism at a predetermined one of said adjustment positions with respect to said support platform.

4. A stabilizer system as set forth in claim 3, wherein said detent means comprises:

a plurality of vertically oriented latch grooves defined upon said slide mechanism; and a plurality of latch claws disposed upon said support platform for engaging said latch grooves of said slide mechanism as said slide mechanism is slidably moved between said adjustment positions with respect to said support platform so as to latch said slide mechanism at a particular one of said adjustment positions with respect to said support platform.

5. A stabilizer system as set forth in claim 4, wherein:

said support platform comprises a base plate spaced from said inclined wall portion of said support platform; and said plurality of latch claws disposed upon said support platform comprises an extension portion disposed within the space defined between said base plate and said inclined wall portion of said support platform for permitting insertion of a manipulating tool into said space defined between said base plate and said inclined wall portion of said support platform for engaging said plurality of latch claws and thereby releasing said plurality of latch claws from said plurality of latch grooves so as to permit positional adjustment of said slide mechanism with respect to said support platform.

6. A stabilizer system as set forth in claim 1, wherein:

said means defined between said support platform and said slide mechanism comprises horizontally disposed guide rail means and corresponding guide groove means defined upon said support platform and said slide mechanism for permitting said horizontal slidable adjustment movement of said slide mechanism with respect to said support platform while restricting any vertical movement of said slide mechanism with respect to said support platform.

7. A stabilizer system as set forth in claim 1, further comprising:

detent means defined between said slide mechanism and said support platform for latching said slide mechanism at a predetermined one of said adjustment positions with respect to said support platform.

8. A stabilizer system as set forth in claim 7, wherein said detent means comprises:

a plurality of vertically oriented latch grooves defined upon said slide mechanism; and a plurality of latch claws disposed upon said support platform for engaging said latch grooves of said slide mechanism as said slide mechanism is slidably moved between said adjustment positions with respect to said support platform so as to latch said slide mechanism at a particular one of said adjustment positions with respect to said support platform.

9. A stabilizer system as set forth in claim 1, wherein:

said contact member comprises a body of hair bristles projecting laterally outwardly from said slide mechanism for engaging said automobile door glass window component.

10. A stabilizer system as set forth in claim 1, further comprising:

a support arm fixedly mounted upon said support platform; and groove means defined within said support arm for receiving a manipulating tool such that said manipulating tool can be used to movably bias said slide mechanism between its adjustment positions with respect to said support platform.

11. A stabilizer system for an automobile door glass window component which is adapted to be vertically raised and lowered, comprising:

an automobile door panel;

an automobile door glass window component disposed adjacent to said automobile door panel and movable between raised and lowered positions;

a support platform having means for attaching said support platform to said automobile door panel;

a slide mechanism slidably mounted upon said support platform between a plurality of adjustment positions;

a contact member mounted upon said slide mechanism for engaging said vertically movable automobile door glass window component and for exerting a predetermined amount of pressure upon said vertically movable automobile door glass window component, depending upon the adjustment position of said slide mechanism with respect to said support platform, so as to stabilize said vertically movable automobile door glass window component during operation of said automobile; and means defined between said support platform and said slide mechanism for permitting positional adjustment of said slide mechanism, and said contact member mounted thereon, with respect to said support platform only in a horizontal direction, and for preventing movement of said slide mechanism, and said contact member mounted thereon, with respect to said support platform in a vertical direction such that said positional adjustment of said slide mechanism, and said contact member mounted thereon, is unaffected by repetitive raised and lowered movements of said automobile door glass window component.

12. A stabilizer system as set forth in claim 11, wherein:

said means defined between said support platform and said slide mechanism comprises said support platform and said slide mechanism both having substantially wedge-shaped portions which comprise oppositely disposed inclined wall portions engaged with each other such that as said slide mechanism is positionally adjusted by movement in a first horizontal direction with respect to said support platform, said contact member mounted upon said slide mechanism is moved in a second horizontal direction toward said automobile door glass window component so as to exert a positionally adjusted predetermined amount of stabilizing pressure upon said automobile door glass window component.

13. A stabilizer system as set forth in claim 12, further comprising:

detent means defined between said slide mechanism and said support platform for latching said slide mechanism at a predetermined one of said adjustment positions with respect to said support platform.

14. A stabilizer system as set forth in claim 13, wherein said detent means comprises:

a plurality of latch grooves defined upon said slide mechanism; and a plurality of latch claws disposed upon said support platform for engaging said latch grooves of said slide mechanism as said slide mechanism is slidably moved between said adjustment positions with respect to said support platform so as to latch said slide mechanism at a particular one of said adjustment positions with respect to said support platform.

15. A stabilizer system as set forth in claim 14, wherein:

said support platform comprises a base plate spaced from said inclined wall portion of said support platform; and said plurality of latch claws disposed upon said support platform comprises an extension portion disposed within the space defined between said base plate and said inclined wall portion of said support platform for permitting insertion of a manipulating tool into said space defined between said base plate and said inclined wall portion of said support platform for engaging said plurality of latch claws and thereby releasing said plurality of latch claws from said plurality of latch grooves so as to permit positional adjustment of said slide mechanism with respect to said support platform.

16. A stabilizer system as set forth in claim 11, wherein:

said means defined between said support platform and said slide, mechanism comprises horizontally disposed guide rail means and corresponding guide groove means defined upon said support platform and said slide mechanism for permitting said horizontal slidable adjustment movement of said slide mechanism with respect to said support platform while restricting any vertical movement of said slide mechanism with respect to said support platform.

17. A stabilizer system as set forth in claim 11, further comprising:

detent means defined between said slide mechanism and said support platform for latching said slide mechanism at a predetermined one of said adjustment positions with respect to said support platform.

18. A stabilizer system as set forth in claim 17, wherein said detent means comprises:
   a plurality of latch grooves defined upon said slide mechanism; and
   a plurality of latch grooves defined upon said slide mechanism; and
   a plurality of latch claws disposed upon said support platform for engaging said latch grooves of said slide mechanism as said slide mechanism is slidably moved between said adjustment positions with respect to said support platform so as to latch said slide mechanism at a particular one of said adjustment positions with respect to said support platform.

19. A stabilizer system as set forth in claim 11, wherein:
   said contact member comprises a body of hair bristles projecting laterally outwardly from said slide mechanism for engaging said automobile door glass window component.

20. A stabilizer system as set forth in claim 11, further comprising:
   a support arm fixedly mounted upon said support platform; and
   groove means defined within said support arm for receiving a manipulating tool such that said manipulating tool can be used to movably bias said slide mechanism between its adjustment positions with respect to said support platform.

* * * * *